United States Patent

[11] 3,601,320

| [72] | Inventor | Niel M. Du Plessis<br>Sesdelaan 2, Boston, Bellville, Cape Province, Republic of South Africa |
|---|---|---|
| [21] | Appl. No. | 832,070 |
| [22] | Filed | June 11, 1969 |
| [45] | Patented | Aug. 24, 1971 |
| [32] | Priority | June 26, 1968 |
| [33] | | Republic of South Africa |
| [31] | | 68/4093 |

[54] APPARATUS FOR BREAKING UP A DIRECTIONAL FLUID STREAM
2 Claims, 2 Drawing Figs.

[52] U.S. Cl. ................................................. 239/542, 239/553.3
[51] Int. Cl. ........................................................ B05b 15/00
[50] Field of Search ............................................ 239/542, 548, 553, 553.3, 590.3

[56] References Cited
UNITED STATES PATENTS

| 2,213,955 | 9/1940 | De Freitas | 239/553.3 X |
| 2,414,873 | 1/1947 | Herbst | 239/553 X |
| 2,494,243 | 1/1950 | Houlis | 239/553.3 X |
| 2,562,328 | 7/1951 | Null | 239/542 |
| 3,221,996 | 12/1965 | Emmert et al. | 239/542 |
| 3,430,867 | 3/1969 | Rodgers et al. | 239/542 |
| 3,156,292 | 11/1964 | Ross | 239/553.3 X |

Primary Examiner—M. Henson Wood, Jr.
Assistant Examiner—Thomas C. Culp, Jr.
Attorney—Peter J. Gaylor ABSTRACT: The apparatus comprises a passage for inflow of a fluid into a volume surrounded by a wall having a plurality of holes in it which admit the fluid to a second volume also surrounded by a wall having a plurality of holes in it in positions which are other than in the direct flow direction of fluid issuing from the holes in the walls surrounding the first volume. The preferred embodiment comprises two tubes, both closed at one end by a single closure component and the volume between them closed at the other end by a component which also incorporate an internally threaded passage for the inflow of fluid adapted to be screw connected on to a source of the fluid. The holes in the two pipes are staggered both axially and angularly in such a manner that if the angular staggering is carried out incompletely or not at all due to prior assembly during manufacture the axial staggering nevertheless provides that the holes of the two pipes are still in positions other than the direct flow direction.

FIG. 1
FIG. 2
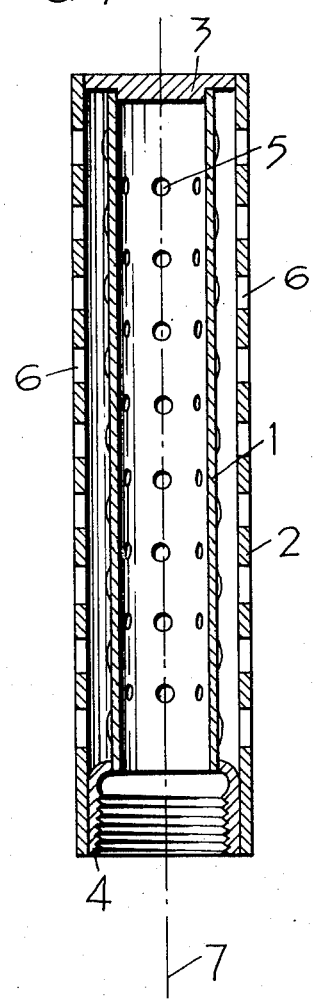
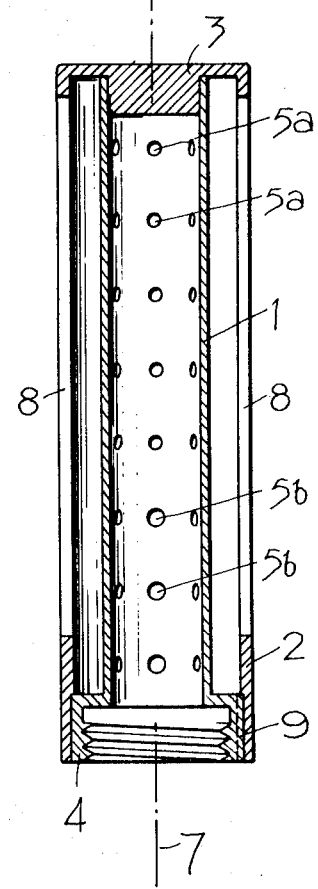

APPARATUS FOR BREAKING UP A DIRECTIONAL FLUID STREAM

BACKGROUND OF THE INVENTION

A well-known and popular manner of watering plants such, for example, as flowers, vegetables, trees and the like is to leave a hose-pipe on the soil near the plants with water running from it so as to soak the soil thoroughly. A well-known problem connected with this method is that water flowing directly from the bore of a hose-pipe or from a nozzle attached to the pipe has a harmful tendency to erode the soil with the result that small plants such as flowers may be uprooted or after a period of time watering in this manner the roots of even larger plants may be exposed to the detriment of the plant. One object of this invention is to mitigate this problem.

SUMMARY OF THE INVENTION

An apparatus in accordance with this invention comprises a passage for the inflow of fluid into a volume surrounded by a wall having a plurality of holes in it which admit the fluid to a second volume also surrounded by a wall having a plurality of holes in it in positions which are other than in the direct flow direction of fluid issuing from the holes in the wall surrounding the first volume.

This invention will be more fully described with reference to the accompanying drawings, in which preferred embodiments thereof are described by way of nonlimiting examples.

BRIEF DESCRIPTION OF THE DRAWINGS

The drawings show two different preferred embodiments of this invention in axial sectional view, all components being of circular cross-sectional shape in planes normal to the section plane, in which, FIG. 1 shows an embodiment which is put together from four components, and FIG. 2 shows an embodiment which is put together from two components.

DESCRIPTION OF THE PREFERRED EMBODIMENTS

As shown in FIG. 1 of the drawings, a preferred embodiment of this invention comprises two tubes 1 and 2 preferably made of brass. At one end a closure piece 3 is sealably attached to both tubes 1 and 2 so as to close the volume inside both tubes 1 and 2 at that end.

At the inflow end the volume between the tube 1 and tube 2 is closed sealably and the volume within the tube 1 is provided with an internally screw-threaded surface for connection to a supply of directional fluid flow, by means of element 4.

Through the walls of both tubes 1 and 2 six rows of holes are bored, the rows parallel to the tube axis 7. The adjacent rows on both tubes enclose an angle of 60° subtended on the axis 7. The distance between centers of adjacent holes on each row is the same on both tubes 1 and 2. The outer tube 2 is provided with nine holes 6 per row and the inner tube 1 with eight holes 5 per row.

It is preferred that the number of holes per row on the outer tube exceed the number of holes per row on the inner tube so that the streamlets issuing from the holes of the outer tube at the ends of the rows are not stronger than the streamlets issuing from the holes in between.

The projection of the centers of the holes in the inner tube 1 orthogonally on the axis 7 lie precisely between the similar projections in the centers of the holes in the outer tube 2. In other words, the rows of holes on the inner tube 1 are 30° angularly out of phase with regard to the rows of holes 6 in the outer tube 2 and the holes 5 in each circle on the inner tube 1 are axially staggered relatively to the holes 6 in each circle on the outer tube 2. This orientation has the result that all the streamlets issuing from the volume inside the inner tube 1 impinge on imperforate parts of the outer tube 2 so that the kinetic energy of the streamlets is practically destroyed or at least greatly reduced.

It is an advantage of the preferred construction in accordance with this invention that the holes 5 in each circle on the inner tube 1 are axially staggered relatively to the holes 6 in each circle on the outer tube 2. This means that if, due to careless assembly of the apparatus, the preferred angular orientation of the tube 1 relative to the tube 2 is not correctly achieved, the holes 6 of the outer tube 2 will still not lie in the direct flow direction of fluid issuing from the holes 5 in the tube 1. When positioning the holes on the two tubes, allowance must be made for the relative axial positions of the tubes when they are assembled onto the closure piece, which in this example provides two reference surfaces which are axially displaced. Correct allowance for this displacement must be made when the holes 5 and 6 are made in the tubes 1 and 2 respectively.

In this example the holes 5 are three thirty-seconds of an inch in diameter, and the holes 6 are one-fourth of an inch in diameter.

Variations of size and form of the tubes 1 and 2 are possible, as also variations of the form and size of the holes. For example, the round holes can be substituted for by slots or slits, or by any other shape of perforation.

Thus the embodiment shown in FIG. 2 employs holes 5 in the pipe 1 as before, but slots 8 in the pipe 2. Like features of this embodiment are denoted by like numerals. However, a first important distinctive feature of this embodiment is that holes $5a$ are of larger diameter than the holes $5b$. For example, where pipe 1 diameter is 16 mm. holes $5a$ could be 3 mm. in diameter and holes $5b$ 2.4 mm. in diameter. This may improve distribution of outflowing water. A second important distinction is that items 1 and 4 are integrally formed (e.g. advantageously cast in a suitable plastics polymer) and items 2 and 3 are integrally formed. Thus the apparatus is assembled from two initial components. This simplification may reduce costs. A key 9 is provided axially in the tube 2 and on assembly engages a corresponding groove in tube 1 which ensures that the slots 8 are located angularly opposite the center of the areas between the holes 5.

The apparatus can be connected to a garden hose so that water can be supplied at a maximum directional stream flow for watering of plants with the minimum of washing away of soil and an even spreading of water. The compactness results in ease of handling.

It may also be possible for the components and methods of construction of the apparatus to be improved or changed in manners which are obvious to those skilled in the art, but the scope of this invention is limited only by the appended claims.

What I claim is:

1. Apparatus for breaking up a directional water stream which comprises
    inner and outer concentric cylindrical walls,
    an inlet connector at one end of the inner wall providing a passage for the inflow of water into a volume surrounded by the inner wall, an end closure wall closing off the end of outer wall nearest the connector, and an end closure wall closing off the ends of the inner and outer walls opposite the connector, in which the inner and outer walls have a plurality of holes in them, the holes in the outer wall being in positions other than the direct flow direction of water issuing from the holes in the inner wall when in use, and in which holes in the inner wall near the connector are of larger size than holes in the inner wall near the end closure wall.

2. Apparatus for breaking up a directional water stream made from plastics polymer, which comprises exclusively:
    an inner circular cylindrical wall with two ends integrally incorporating an inlet connector at one end which provides a passage for the inflow of water into a volume within the inner wall, the inner wall having a plurality of holes in it,
    and an outer concentric circular cylindrical wall with two ends, integrally incorporating at the end opposite to the connector an end closure wall adapted to close off that end of both the volume within the inner wall and a volume between the inner and outer walls, the end closure wall having a formation on its inside face adapted to locate the end of the inner wall concentrically and facilitate sealing and assembly, and in which the end of the volume between the inner and outer walls opposite the end closure wall integral with the outer wall is closed off by the connector which also concentrically locates the outer tube, the outer wall having a plurality of holes in it in positions other than in the direct flow direction of water issuing from the holes in the inner wall when in use.